United States Patent
Schulz et al.

(10) Patent No.: US 7,630,503 B2
(45) Date of Patent: Dec. 8, 2009

(54) DETECTING ACOUSTIC ECHOES USING MICROPHONE ARRAYS

(75) Inventors: Dieter Schulz, Ottawa (CA); Graham Thompson, Kanata (CA); Charn Leung (David) Lo, Ottawa (CA); Rafik Goubran, Ottawa (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 1133 days.

(21) Appl. No.: 10/971,213

(22) Filed: Oct. 21, 2004

(65) Prior Publication Data

US 2005/0084116 A1    Apr. 21, 2005

(30) Foreign Application Priority Data

Oct. 21, 2003    (GB)  ................................. 0324536.2

(51) Int. Cl.
*H04R 3/00* (2006.01)
(52) U.S. Cl. .......................................... 381/92; 381/66
(58) Field of Classification Search ..... 381/71.1–71.12, 381/92, 94.1–94.3, 66; 379/406.1–406.16; 367/118–129; 704/233–234, 237, 224; 702/190
See application file for complete search history.

(56) References Cited

U.S. PATENT DOCUMENTS

| | | | |
|---|---|---|---|
| 4,131,760 A | 12/1978 | Christensen et al. | |
| 4,581,758 A | 4/1986 | Coker | |
| 5,323,459 A * | 6/1994 | Hirano | 379/391 |
| 5,606,376 A | 2/1997 | Shinohara | |
| 5,608,839 A | 3/1997 | Chen | |
| 5,953,049 A | 9/1999 | Horn et al. | |
| 6,160,758 A * | 12/2000 | Spiesberger | 367/125 |
| 6,198,693 B1 * | 3/2001 | Marash | 367/125 |
| 6,774,934 B1 * | 8/2004 | Belt et al. | 348/211.1 |
| 7,054,452 B2 * | 5/2006 | Ukita | 381/92 |
| 7,308,105 B2 * | 12/2007 | Bullen | 381/57 |
| 2002/0001389 A1 | 1/2002 | Amiri | |
| 2002/0048376 A1 | 4/2002 | Ukita | |
| 2002/0126834 A1 | 9/2002 | Seibert | |
| 2003/0051532 A1 | 3/2003 | Beaucoup | |

FOREIGN PATENT DOCUMENTS

| | | |
|---|---|---|
| GB | 2215938 | 9/1989 |
| GB | 2351627 | 1/2001 |
| GB | 0324536.2 | 3/2004 |
| WO | WO 00/28740 A | 5/2000 |
| WO | WO 01/35118 A | 5/2001 |

OTHER PUBLICATIONS

Author David Lo et al Title: Acoustic Detection for Microphone Array Applications IEEE 2005.*

(Continued)

*Primary Examiner*—Xu Mei
*Assistant Examiner*—Fatimat O Olaniran

(57) ABSTRACT

A method is provided for discriminating between the case of a single talker with an acoustic reflection and the case of two talkers, regardless of their power levels. The method is implemented in real time by performing a cross-correlation between pairs of average power signals originating from pairs of beamformers. A detection decision is then made based on the value of the cross correlation and its lag.

9 Claims, 5 Drawing Sheets

OTHER PUBLICATIONS

E. Lleida, et al. "Robust Continuous Speech Recognition System Based on a Microphone Array" IEEE Jun. 1998 pp. 241-244.
A. Vahedian et al. "Improving Videophone Subjective Quality Using Audio Information" Aug. 1999 pp. 86-95 vol. 10; John Wiley & Sons, Inc.
H. Wang et al. "Voice Source Localization for Automatic Camera Pointing System in Videoconferencing" 1997.
C. Wang et al. "Robust Automatic Viceo-Conferencing with Multiple Cameras and Microphones" IEEE 2000 pp. 1585-1588.
C. Wang et al. "Real-Time Automated Video and Audio Capture with Multiple Cameras and Microphones" Journal of VLSI Signal Processing 2001 pp. 81-99.
C. Wang et al. "Multi-Source Face Tracking with Audio and Visual Data" Jan. 1999 pp. 169-174.
EU Search Report, May 20, 2009, Schulz et al.
Brandstein et al., "A practical methodology for speech source localization with microphone arrays", Computer Speech & Language 1997 pp. 91-126; Academic Press Ltd. 1997.

* cited by examiner

DETECTING ACOUSTIC ECHOES USING MICROPHONE ARRAYS

BACKGROUND OF THE INVENTION

1. Field of the Invention

The present invention is directed to audio conferencing systems, and more particularly to a method of discriminating between a single talker with an acoustic reflection and two talkers regardless of their power levels.

2. Description of the Related Art

In hands-free audio conferencing systems, acoustic reflections from the walls cause reverberations that deteriorate the audio quality. This phenomenon is commonly known as the barrel effect.

Microphone arrays and beamforming techniques can be used to solve this problem by capturing the sound originating from a desired direction and attenuating the sounds originating from all other directions. However, simple microphone arrays cannot discriminate between the case of a single talker with a strong acoustic reflection and the case of two different talkers.

This problem is more serious when azimuth data from the microphone array is used for non-audio purposes, for example, to steer a video camera in a video conferencing system. If the microphone array mistakenly interprets a reflection as a second talker, the camera will point to the wall, post, or column that caused the reflection. This scenario is common when a talker looks to another participant in the conference instead of looking at the microphone array, resulting in a reflected audio signal that is stronger than the direct path signal. This, in turn, leads to an incorrect localization by the array.

Most audio systems require the talkers to be as close as possible to the microphones so that the direct path signal is significantly stronger than the reflections. In applications where the location of the desired audio signal is known and fixed, directional microphones are usually used. In other applications where the location of the desired audio signal is not known and/or is dynamic, a microphone array, either of switched directional microphones or omnidirectional microphones equipped with a beamforming algorithm is usually used to locate and track the desired audio signal.

A number of different approaches have been proposed to solve this problem [see F. Beaucoup, M. Tetelbaum, Robust Talker Localization in Reverberant Environment, U.S. patent application 20030051532, Mar. 20, 2003; A. Maziar; D. Schulz, M. Tetelbaum, Acoustic talker localization, U.S. patent application 20020001389, Jan. 3, 2002; and C. H. Coker, D. R. Fishell, Acoustic direction Identification System, U.S. Pat. No. 4,581,758, Apr. 8, 1986]. Other approaches include the use of near-field beam forming techniques to restrict the detection capability of the microphone array to a given distance from the array, thus reducing the magnitude of the acoustic reflections.

SUMMARY OF THE INVENTION

According to the present invention, a method is provided for discriminating between the case of a single talker with an acoustic reflection and the case of two talkers regardless of their power levels. The algorithm is simple and can be implemented in real time by performing a cross-correlation between pairs of average power signals originating from pairs of beamformers. A detection decision is then made based on the value of the cross correlation and its lag.

Although it is known in the prior art to use cross correlation of the signals originating from pairs of microphones [e.g. U.S. Pat. No. 4,581,758, referred to above], the present invention distinguishes over the prior art by cross correlating the average power of the output pairs of beamformers. The method according to the present invention is not restricted to a specific beamforming technique and can be used with any beamformer or microphone array.

A significant reduction in complexity is achieved by the fact that the cross-correlation is performed on the average power signals and not the raw microphone signals. The average power signal is band-limited to less that 100 Hz and can therefore be decimated and sampled at only a few hundred Hz.

DETAILED DESCRIPTION OF THE PREFERRED EMBODIMENTS

Given any microphone array with any number of microphones and any beamforming algorithm capable of detecting audio signals originating from N different directions (sectors), the beamformer generates N output signals $B1(t)$, $B2(t)$, ..., $BN(t)$. The beamforming algorithm combines the signals from the various microphones of the array to enhance the audio signal originating from a desired location and attenuate the audio signals originating from all other locations.

According to the method of the present invention, the average power of the audio signal for each of the N sectors: $B1(t)$, $B2(t)$, ..., $BN(t)$ is calculated on a continuous basis resulting in power signals $P1(t)$, $P2(t)$, ..., $PN(t)$. A determination is then made as to the active beamformer sectors, where an audio sector 'i' is considered active if its $Pi(t)$ exceeds a predetermined threshold value. The power signal $Pi(t)$ from each active beamformer is then normalized.

Next, the cross correlation function of the normalized power signals is computed for all pairs of active audio sectors. For each cross correlation calculation, the maximum cross correlation (0-100%) is recorded, along with the value of the lag between the two signals at which this maximum cross correlation occurs.

In the case of a single talker with acoustic reflections, the value of the cross correlation will be high and the absolute value of the lag will also be high (representing the delay between the path of the direct signal and the reflected signal).

In the case of two separate talkers, the cross correlation may also be high due to similarities in the signal, such as the pitch, and the side lobes of the beamforming algorithm. However, the lag will be very small (representing the small delay due to the distance between the microphones and the delay due the beamforming algorithm).

Since the power signal has significantly lower frequency components than the original audio signals, the cross correlation is performed at a lower frequency than is possible according to the prior art, thereby reducing computational complexity relative to the prior art.

Figure 1:
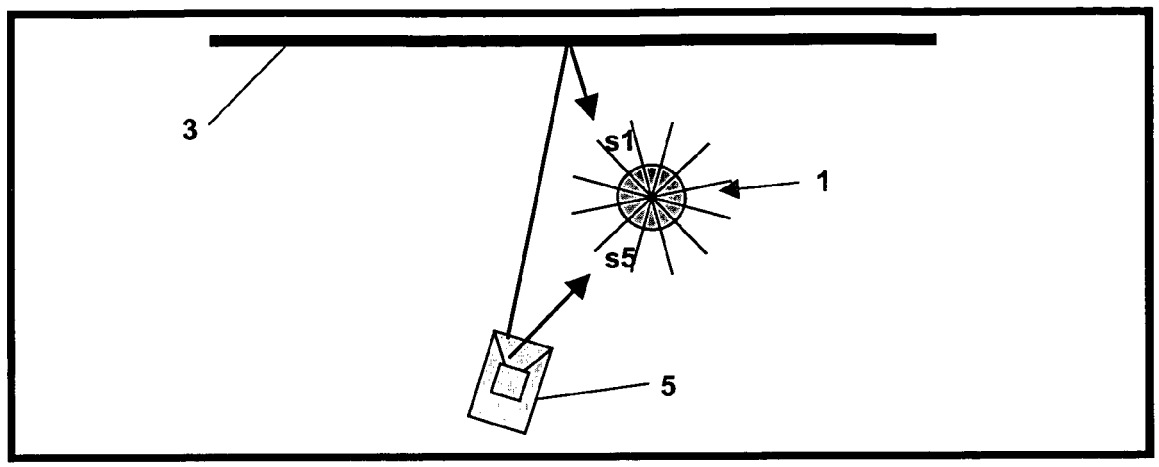
FIG. 1 shows an experimental setup for implementing the method of the present invention for a single talker and his/her reflection reaching a microphone array.

FIG. 1 depicts an experimental setup consisting of a microphone array 1, a 1.5×6 meter sound reflective panel 3, and a loudspeaker 5 playing a male human voice reproduced by a tape recorder (not shown). This case represents the scenario where the voice of a single talker and its reflection reach the microphone array 1. The sound reflective panel 3 was used to deliberately create strong echo signals.

Figure 2:
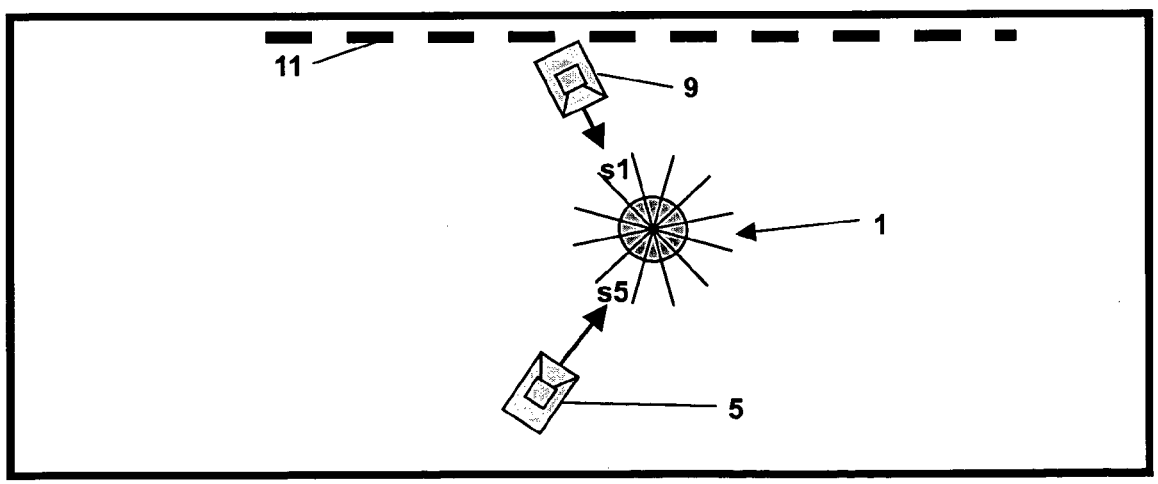
FIG. 2 shows an experimental setup for implementing the method of the present invention where the audio signals from 2 separate talkers reach the microphone array.

In the second experiment, shown in FIG. 2, a further loudspeaker 9 was added to project the sound of a female voice from the location where echoes had been generated in the scenario of FIG. 1. A sound absorbing panel 11 replaced the reflective panel 3 to minimize the echoes in the room. This case represents the scenario where voice signals from two separate talkers reach the microphone array 1.

Figure 3:
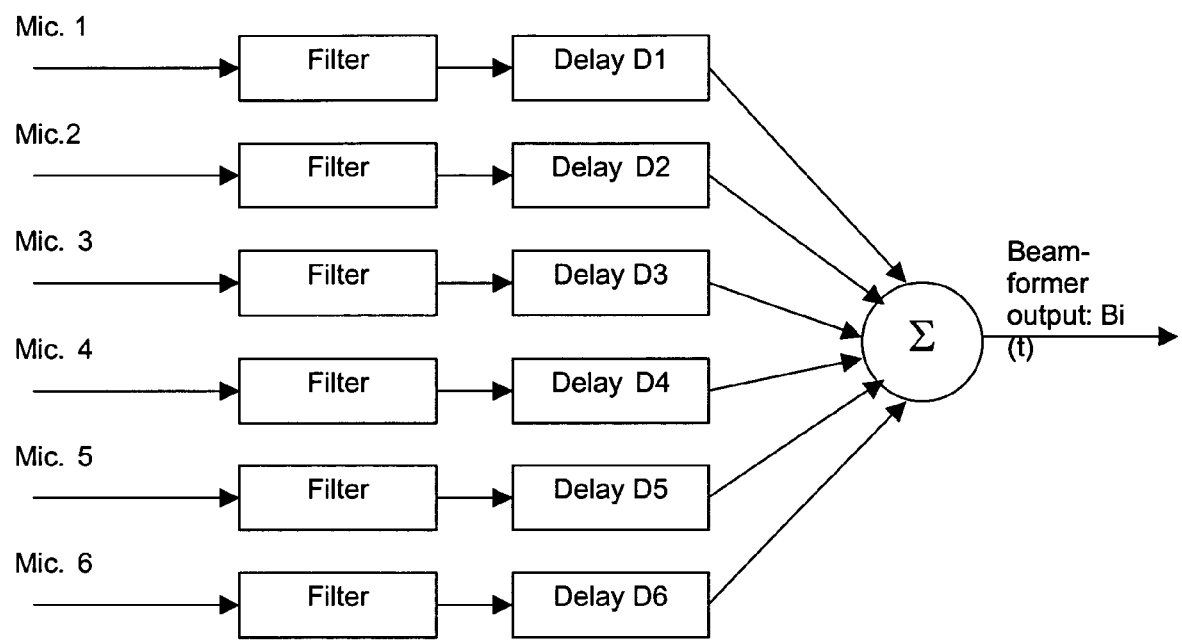
FIG. 3 is a block diagram of a prior art delay-and-sum beamformer for use with the method according to the present invention.
Figure 4:
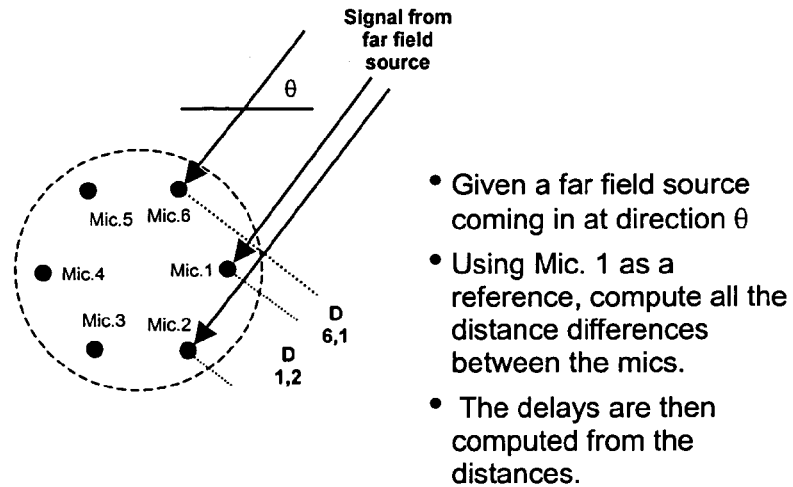
FIG. 4 is a schematic representation of delay computation according to the method of the present invention, using a beamformer such as shown in FIG. 3.

Audio data from the microphone array 1 was digitized and sampled at 8 KHz, in a well-known manner. A Digital Signal Processing (DSP) board (not shown) equipped with an Analog Devices Inc. (ADI) floating point DSP chip was used to perform delay-and-sum beamforming on the audio data, as shown in FIG. 3. The beamformer delays were calculated based on the physical layout of the microphone array 1, as shown in FIG. 4.

Figure 5:
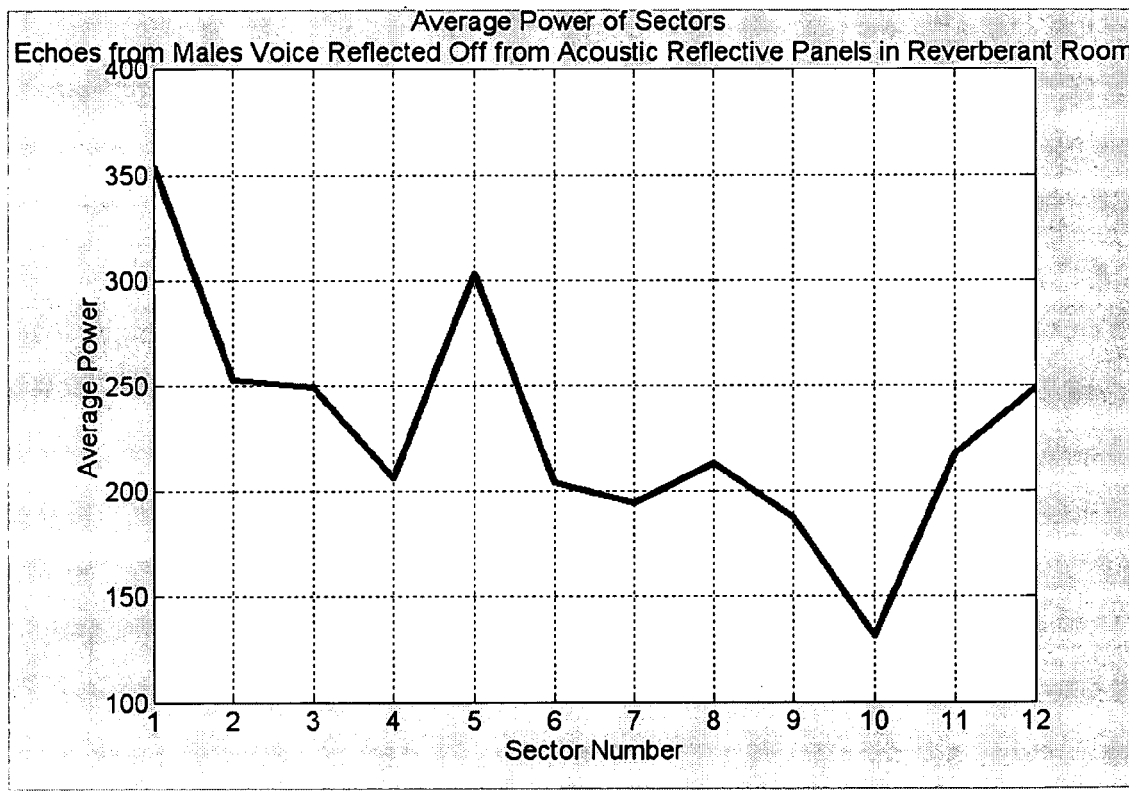
FIG. 5 is a graph showing the average signal power in each sector, wherein each sector uses a beamformer such as shown in FIG. 3.

It should be noted that the beamforming algorithm is not limited to a delay-and-sum beamformer as shown in FIG. 3, but may include more sophisticated beamforming algorithms. The specific choice of beamformer is immaterial. Thus, an alternative embodiment may use switched directional microphone arrays According to the experimental set up for testing the method of the present invention, the beamformer algorithm was implemented for each of 12 sectors. For each sector, the power was averaged using an averaging data window (e.g. 0.25 s). The length of the data window may be varied depending on the particular application. FIG. 5 shows an average power plot, wherein the X axis is the sector number and Y axis represents the average power.

Using a threshold for voice activity detection, the two sectors with the highest power, (i.e. sectors 1 and 5 in FIG. 5, were identified as the active sectors.

Before computing the cross-correlation, the beamformer output signal power was normalized. The normalization was done by dividing the beamformer output signal power Pi(t) by its Root-Mean-Square (RMS) value, as follows:

$$RMS(P_i(t)) = \frac{\sqrt{\sum_{j=1}^{M} P_i(t-j)^2}}{M}$$

Where M is the number of data samples used within the window.

After normalizing the signals, the cross-correlation was computed to provide outputs in the range from 0 to 1, with 0 meaning no correlation and 1 meaning 100% correlation. The cross-correlation between the active sectors, 1 and 5, was computed using a correlation data window (e.g. 0.875 s). As indicated above, depending on the application, the lengths of this data window can also be varied.

It should also be noted that in the event of more than two active sectors, the identical normalization is used and then cross-correlation computed for two active sectors at a time until all active sectors have been checked.

During the cross-correlation calculation, the lag between the two signals at which the maximum correlation occurred was recorded as the maximum correlation lag (see FIGS. 6 and 7), it should be noted that the correlation lag can be positive or negative.

Figure 6:
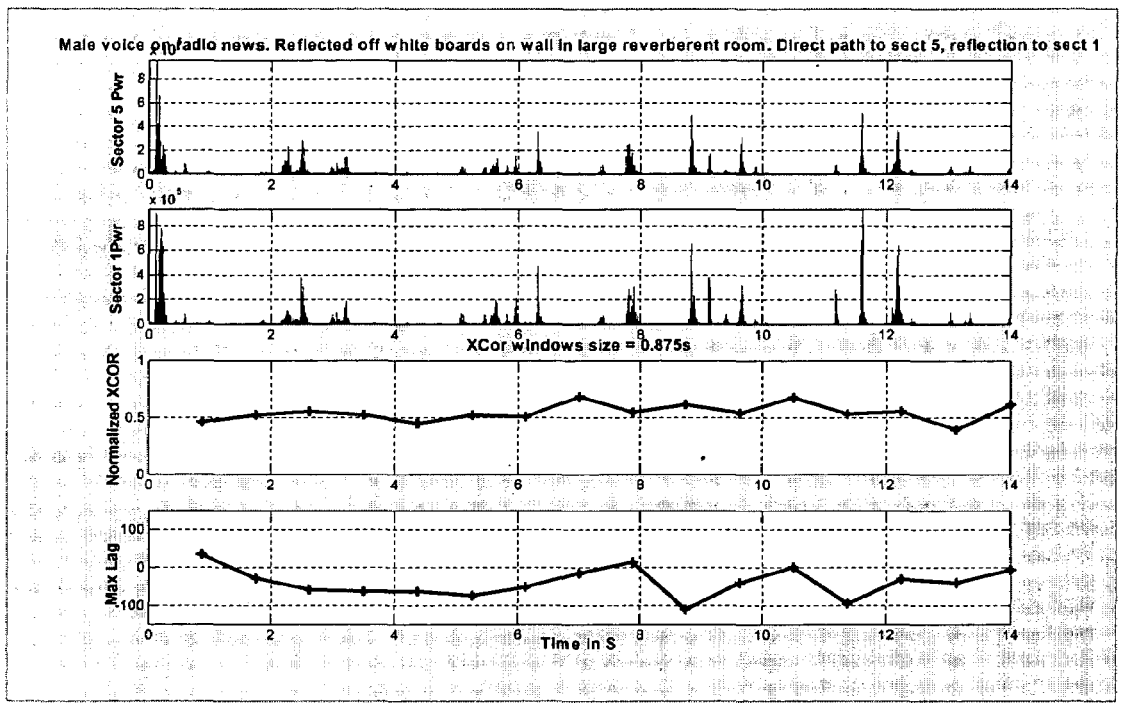
FIG. 6 consists of plots showing signal power from two beamformer sectors for a single talker with reverberation, along with cross-correlation and time lag, according to the method of the present invention.

In the case of a single talker with acoustic reflections, the value of the cross-correlation and the absolute value of the lag are both high, as shown in FIG. 6, representing the delay between the path of the direct signal and the reflected one signal. The top two plots of FIG. 6 show the signal power of the beam-formed signals for sectors 5 and 1. The middle plot shows the normalized cross-correlation. The bottom plot shows the maximum lag, wherein it will be noted that the max. lag has a general trend around −70.

Figure 7:
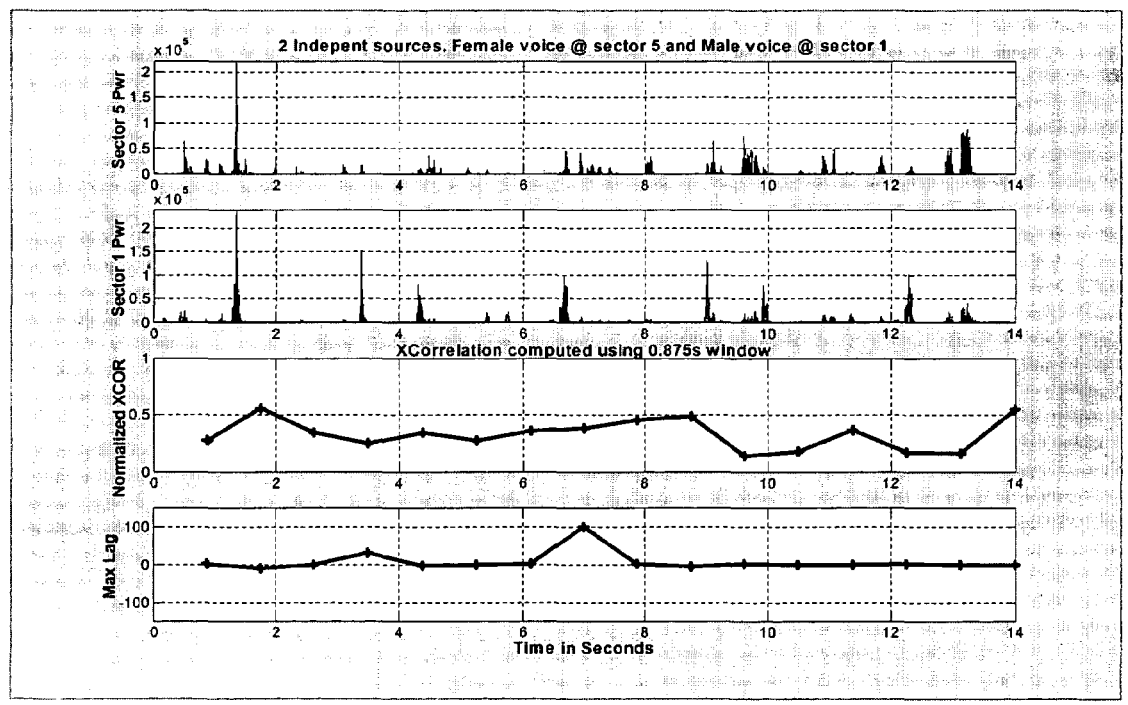
FIG. 7 consists of plots showing signal power from two beamformer sectors for two talkers, along with cross-correlation and time lag, according to the method of the present invention.

In the case of two separate talkers, the cross correlation is high due to the side lobes of the beam-forming algorithm. However, the lag is very small, as shown in FIG. 7. In this case, the lag reflects the small delay due to the distance between the microphones and the delay due to the beamforming algorithm. It will be noted from the bottom plot that the max, lag has a general trend around 0.

As seen from FIGS. 6 and 7, cross-correlation itself is not a very reliable indicator for acoustic echoes. However, the maximum lag consistently shows a large magnitude in the presence of reflections, compared to the very small magnitude of the maximum lag in the case of two separate talkers.

Figure 8:
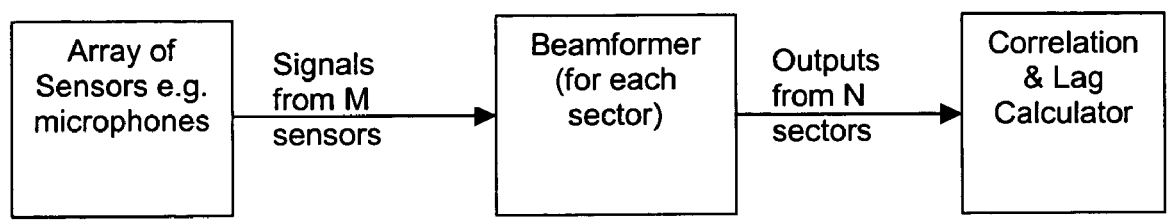
FIG. 8 is a block diagram of an apparatus for implementing the method according to the present invention.

FIG. 8 shows one embodiment of an apparatus for carrying out the method of the present invention. The signals from the M sensors (in this case microphones) are fed into the beamformers for each of N sector. The N outputs of the sectors are fed into a correlation and lag calculation algorithm for analysis, as set forth above.

The many features and advantages of the invention are apparent from the detailed specification and, thus, it is intended by the appended claims to cover all such features and advantages of the invention that fall within the sphere and scope of the invention. For example, a person of ordinary skill in the art will realize that the principles of the invention may be applied to any sensor array, and is not restricted only to microphone arrays, as shown in FIG. 8. Such a skilled person will also understand that echoes detected using the system of the present invention may then be eliminated from the ultimate array output by selecting the direct path to the talker. Since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of discriminating between a single signal source with reflection and two individual signal sources, said method comprising:

detecting, by a sensor array, a plurality of signals originating from said signal sources, said sensor array for receiving said signals via respective multiple sensors arranged in paired sectors of said array;

Generating, by a beamformer, a plurality of power signals resulting from an average power of the signal received from each of said sectors;

Computing a cross correlation function of said power signals for respective pairs of said sectors;

For each said cross correlation function, recording a maximum cross correlation and a lag between the pair of power signals at which said maximum cross correlation occurs; and Identifying said single signal source with reflection in the event that said lag is of high absolute magnitude, and identifying said two individual signal sources in the event that said lag is of low absolute magnitude.

2. The method of claim 1, further comprising normalizing said power signals prior to computing said cross correlation function.

3. The method of claim 2, further comprising determining active ones of said sectors, wherein a sector is deemed to be active if the respective power signal exceeds a predetermined threshold, and normalizing the power signals from only the active ones of said sectors.

4. The method of claim 1, wherein said received signals are audio signals and said sensor array is a microphone array.

5. The method of claim 2, wherein said received signals are audio signals and said sensor array is a microphone array.

6. The method of claim 3, wherein said received signals are audio signals and said sensor array is a microphone array.

7. The method of claim 4, wherein said function is computed via delay and sum beamforming.

8. The method of claim 5, wherein said function is computed via delay and sum beamforming.

9. The method of claim 6, wherein said function is computed via delay and sum beamforming.

* * * * *